US007403529B2

(12) United States Patent
Hoffmann (10) Patent No.: US 7,403,529 B2
(45) Date of Patent: Jul. 22, 2008

(54) METHOD FOR TRANSMITTING DATA OF DIFFERENT APPLICATIONS VIA PACKET TRANSMISSION NETWORK, CORRESPONDING UNITS AND CORRESPONDING PROGRAM (75) Inventor: Klaus Hoffmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 884 days.

(21) Appl. No.: 10/450,143

(22) PCT Filed: Nov. 22, 2001

(86) PCT No.: PCT/EP01/13610

§ 371 (c)(1),
(2), (4) Date: Nov. 10, 2003

(87) PCT Pub. No.: WO02/49297

PCT Pub. Date: Jun. 20, 2002

(65) Prior Publication Data

US 2004/0105437 A1    Jun. 3, 2004

(30) Foreign Application Priority Data

Dec. 14, 2000    (EP) .................................. 00127455

(51) Int. Cl.
*H04L 12/56* (2006.01)
*H04L 1/16* (2006.01)
(52) U.S. Cl. ........................ 370/394; 370/252; 370/356
(58) Field of Classification Search ................. 370/394, 370/252, 352, 356
See application file for complete search history.

(56) References Cited

U.S. PATENT DOCUMENTS 5,963,551 A * 10/1999 Minko ........................ 370/356
6,085,252 A *  7/2000 Zhu et al. .................... 709/231
6,577,631 B1 *  6/2003 Keenan et al. ............... 370/394
6,795,435 B1 *  9/2004 Jouppi et al. ................ 370/394

* cited by examiner

*Primary Examiner*—Min Jung
(74) *Attorney, Agent, or Firm*—Bell, Boyd & Lloyd LLP (57) ABSTRACT The operator console of a switching node has a connection to the Internet for accessing the resources of the switching node. The basis for features which require interaction between the switched connection network (PSTN) and the Internet are provided at a low cost.

11 Claims, 3 Drawing Sheets

FIG 1

METHOD FOR TRANSMITTING DATA OF DIFFERENT APPLICATIONS VIA PACKET TRANSMISSION NETWORK, CORRESPONDING UNITS AND CORRESPONDING PROGRAM

CLAIM FOR PRIORITY

This application claims priority to PCT/EPO1/13610, filed in the German language on Nov. 22, 2001, which claims the benefit to German application No. 00127455.2, filed in the German language on Dec. 14, 2000.

TECHNICAL FIELD OF THE INVENTION

The invention relates to a method for transmitting data of different application, and in particular, in which data packets include routing data and useful data, in a packet transmission network.

BACKGROUND OF THE INVENTION

The packet transmission network is, for example, the internet or a data transmission network operating according to an internet protocol. However other packet transmission networks are also used, for example ATM networks (Asynchronous Transfer Mode). In an ATM network the data packets are also referred to as cells. The data packets or cells contain routing data, which is used to forward the useful data contained in the data packets, e.g. address data or path or channel details.

The data packets are transmitted on different transmission paths and/or with different delay times via the packet transmission network. The sequence of the data packets must be reset in the receiver for many applications. For these purposes the data packets for example contain a sequence number or a time stamp. Reference should be made in this context for example to the RTP (Real Time Protocol) transmission protocol, which is stipulated in the defacto IETF (Internet Engineering Task Force) standards RFC (Request for Comment) 1889 and RFC 1890. The header of an RTP data packet therefore contains a sequence number and a time stamp among other things, see RFC 1889, clause 5.1. A jitter buffer is used to effect a transmission with acceptable transmission times despite delays and data packet losses. Data packets are stored for a specific time in the jitter buffer, until the system is no longer waiting for an outstanding packet. If the jitter buffer is full, transmission continues even if individual data packets are missing or a repeat transmission is requested. The size of the jitter buffer therefore influences the waiting time for which the transmission is delayed in the event of missing data packets.

Control of the size of the jitter buffer and therefore the waiting time based on the capabilities of an encoder is known from the standard H.323 "Packet based multimedia communications systems" from the ITU-T (International Telecommunication Union—Telecommunication Standardization Sector), clause 6.2.5.

SUMMARY OF THE INVENTION

The invention discloses a method for transmitting data of different applications via a packet transmission network, which in particular ensures that delays in the transmission of the data packets or data packet losses for different applications remain within acceptable limits, without having an excessively detrimental effect on specific applications. Corresponding units and a corresponding program should also be specified.

In the invention, in addition to the method described above, the data packets continue to be processed in the reset sequence based on a comparison variable, even if a previous data packet has not yet been received. Alternatively repeat transmission of at least one data packet is requested based on the comparison variable. Also, different values of the comparison variable are predetermined for different applications depending on the application for which the useful data is transmitted. The value for the comparison variable is expediently determined before the start of transmission of the data packets.

The invention allows the comparison variable to be tailored to different applications despite the use of a common transmission protocol. Predetermining the comparison variable based on the type of application means that the comparison variable can be selected optimally for every application, without having to take account of other applications. For example for the real-time transmission of voice data a comparison variable is selected, which results in delays of maximum 30 milliseconds due to waiting for a data packet. 30 milliseconds is still tolerable for the transmission of voice data, without the voice quality dropping below an acceptable value. For the transmission of data, the transmission of which does not depend on real-time conditions, a significantly higher value is selected for the comparison variable, for example 250 milliseconds. This data is referred to hereafter as computer data. The longer waiting time or larger buffer means that the error rate is smaller for the transmission of computer data than for the transmission of voice data. The longer waiting time means it is also possible to process data packets which have a longer transmission time.

In one embodiment of the invention, the data packets each include a sequence number to stipulate the sequence and/or time details, showing the relationship between the useful data included in the relevant data packets and a reference time or reference clock. The measured data are comparatively simple to allow resetting of the data packet sequence. The use of time details is particularly recommended when clock synchronization is required at the receiver.

In another embodiment, the transmission protocol is a protocol, which is suitable for the real-time transmission of useful data. Real-time transmission means that the data is generated on the transmission side and then has to be received by the receiver within a specifically predetermined time period. In the case of voice data the time period is 30 milliseconds, for example. A suitable protocol for real-time transmission is the RTP protocol, which is stipulated in the defacto standards RFC 1889 and 1890 referred to above. The RTP protocol is particularly suitable for the transmission of data packets via the internet.

In another embodiment, one type of application is the transmission of voice data in real time. The other type of application is the transmission of computer data, which is already stored in full in a transmission unit before the start of the transmission. Such computer data is, for example, program data for specifying commands for a processor, text data, which specifies the wording of a text or image data, which specifies image elements of an image. But voice data, e.g. a dictation, can also be computer data. The transmission protocol should therefore be suitable for real-time transmission of data. However, the transmission protocol that is suitable for the real-time transmission is also used for the transmission of data, for which real-time transmission might not actually be necessary. As mentioned above, the use of only one transmission protocol means a reduction in implementation costs. Also, the transmission protocol does not have to be changed every time the type of application changes. The longer wait in the case of computer data means that fewer requests are made for repeat transmission. The bit error rate for the transmission of computer data drops.

In another embodiment of the invention, a transmission path is established between two terminals of a circuit-switched telecommunication network for the transmission of useful data. A section of the transmission path between two gateways is located in the packet transmission network. The gateways are controlled by at least one control unit. The control unit of the gateway receiving the data packets or the control units of the gateways receiving the data packets in the case of bi-directional transmission predetermine(s) the value of the comparison variable.

The circuit-switched telecommunication network is for example a network in which the useful data is forwarded in time channels, e.g. in time channels of a PCM system (Pulse Code Modulation). Such a network is for example the telephone network of Deutsche Telekom AG. The control unit predetermines the value for the comparison variable, e.g. in a separate control message. However messages used for other purposes may also be extended to include a field for transferring the value of the comparison variable. The embodiment allows data of different applications to be transmitted easily even when circuit-switched telecommunication networks and packet transmission networks are shared. The advantages of the different networks can be better utilized in this way.

In a subsequent embodiment the control unit is located at a distance from a gateway, e.g. at a distance of several 100 km. A standard protocol or a defacto standard protocol is used between the control unit and the gateway to transmit control messages. The protocol according to ITU-T standard H.248, the MGCP protocol (Media Gateway Control Protocol) is therefore used, see RFC 2705. The value of the comparison variable is also transmitted taking into account these protocols or a protocol based on these protocols.

In still another embodiment, the control unit sends a connection set-up message to the gateways receiving the data packets with the useful data, specifying the value for the comparison variable. This measure allows the value for the comparison variable to be transmitted with a connection set-up message that had to be transmitted anyway. Additional messages are not required for transmitting the comparison variable. When using the MGCP protocol in one configuration the comparison variable is designated by an identifier beginning with "X-", which refers to what is known as an experimental parameter, see defacto standard RFC 2705, clause 3.2.2 "Parameter lines", parameter "X-". An identifier "X-MaJiBu" is therefore used to refer to the comparison variable in the nature of a meaningful name. The identifier is an acronym for the size of a maximum jitter buffer.

In a subsequent development at least one switching center of the circuit-switched network is included in the stipulation of the transmission path. The type of data application is determined using the value of a parameter stipulated in a signaling protocol for the switching center. The parameter TMR (Transmission Medium Requirement) stipulated in the ISUP standard (ISDN user part) or in the BICC standard for describing the requirement for the transmission medium can therefore be used. The switching center then prompts predetermination of the value for the comparison variable based on the value of the parameter. The type of application can therefore be determined comparatively easily. The switching centers are involved anyway where necessary in setting up a transmission path so the cost of determining the type of application is marginal.

The core of the ISUP standard drawn up by the ITU-T (International Telecommunication Union—Telecommunication Standardization Sector) contains the following standards:

Q.761(21/99) "Signaling System No. 7—ISDN user part functional description",

Q.762 (2000) "Signaling System No. 7—ISDN user part general function of messages and signals", Q.763 (1997) "Signaling System No. 7—ISDN user part formats and codes", and Q.764 (09/97) "Signaling System No. 7—ISDN user part signaling procedures".

The parameter TMR referred to is therefore specified in Q.764, clause 2.1.1.1a. The values for the parameter TMR are stipulated in the standard Q.763, clause 3.54. The value zero for example indicates voice data. The value two indicates "64 kBit/s unrestricted" and refers for example to the transmission of computer data.

The BICC standard is contained within the standard Q.1901 "Bearer Independent Call Control Protocol" drawn up by the ITU-T. The BICC standard is based on the ISUP standard but is different from this standard. For example the central CIC (Circuit Identification Code) has to be lengthened from two bytes to four bytes. At present the BICC standard relates to the transmission of useful data in an ATM network. Extension to IP networks (Internet Protocol) is foreseeable.

The switching centers can also be used for connection set-up and connection clearance. Signaling messages can also be exchanged between gateways via the switching centers. A transport method stipulated for the standards and with specific transport elements is used for exchanging these messages. Such a transport element is stipulated for example in the standard Q.763 Add. 1 (06/00) and is designated there as an APP container (Application Transport Parameter). The transport protocol for this container is determined in the standard Q.765 "Revised Recommendation Q.765 (Application Transport Mechanism)". The standard Q.765.5 "Application Transport Mechanism—Bearer Independent Call Control" is based on the standard Q.765 and was developed specifically for the BICC standard. However the transport elements specified in the standard Q.765.5 can also be used when using the ISUP standard, in particular when complying with the standards forming the core as specified above.

In a different embodiment, the packet transmission network is the internet or another data transmission network operating according to internet protocol. Signaling between switching centers of the circuit-switched network is executed according to the BICC standard or according to a slightly modified ISUP standard.

The invention also relates to a gateway, a control unit for a gateway and a switching center. The said units are used to implement the inventive method and its developments. The technical effects referred to above therefore also apply to these units.

The invention also relates to a program with a sequence of commands, during the execution of which the invention is executed by a processor or the function of one of the corresponding units is provided. The technical effects referred to above also apply to the program.

BRIEF DESCRIPTION OF THE DRAWINGS

Embodiments of the invention are described below using the attached drawings. These show.

DETAILED DESCRIPTION OF THE INVENTION

Figure 1:
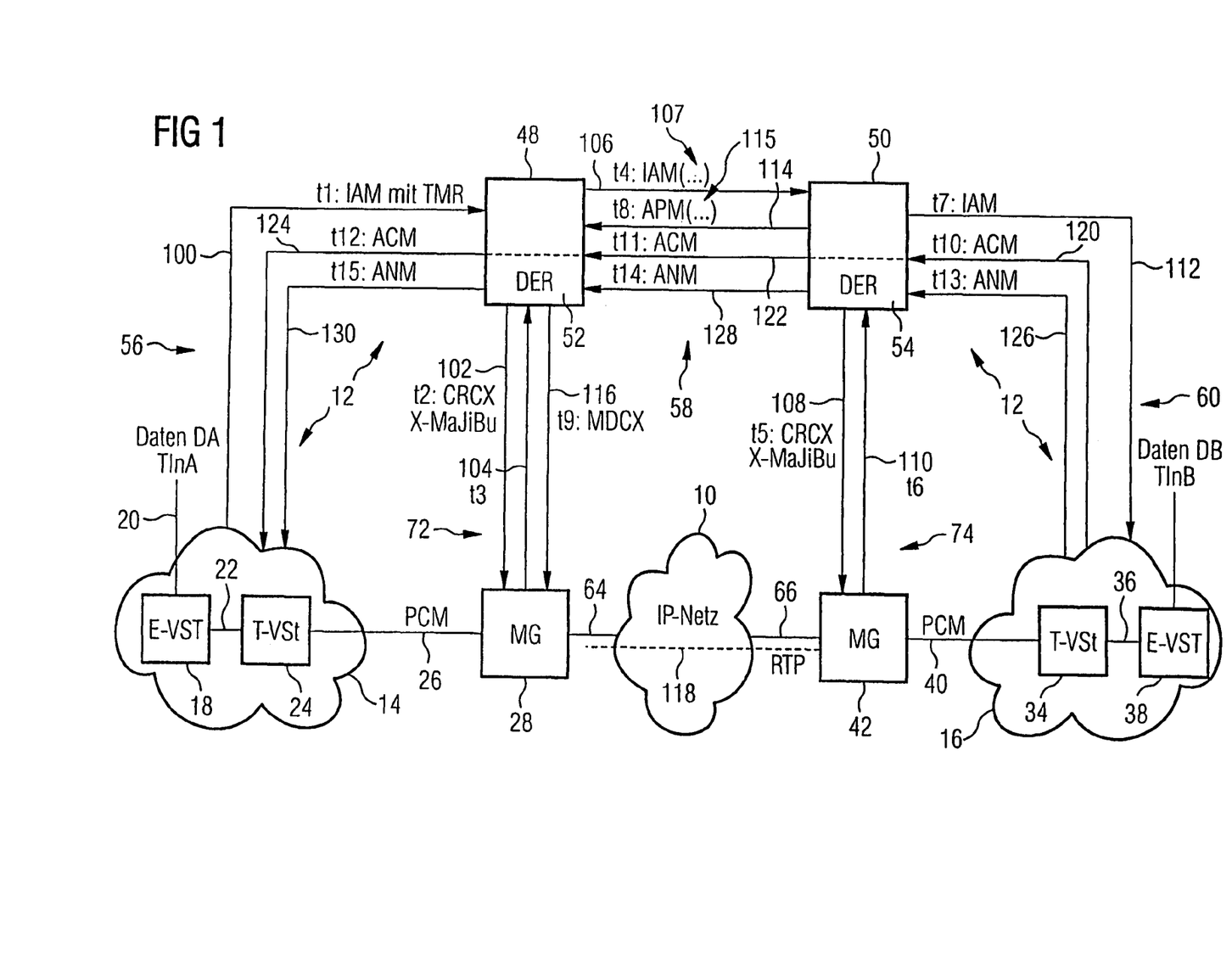
FIG. 1 shows a telephone network connected to the internet and signaling messages exchanged in the connected networks to establish transmission paths.

FIG. 1 shows a telephone network 12 connected to the internet 10, e.g. the Deutsche Telekom AG telephone network. FIG. 1 shows two parts 14 and 16 of the telephone network 12. The part 14 is located for example in South Germany and the part 16 in North Germany. A terminal switching center 18 is shown in the part 14, to which a data transmission computer DA of a subscriber TlnA is connected via a transmission line 20, e.g. via an ISDN connection (Integrated Services Digital Network). The terminal switching center 18 is connected via an inter-exchange line 22 to a transit switching center 24. The transit switching center 24 is for example a conventional EWSD-type (digital electronic switching system) switching center from Siemens AG. A transmission route 26 goes from the transit switching center 24 to a gateway 28. The transmission route 26 is for example a channel of a PCM-30 system (Pulse Code Modulation), as used for the transmission of voice data between different switching centers. The PCM method uses the ITU-T CODEC G.711. The connections between different switching centers are also referred to as trunks. The function of the gateway 28 is described in more detail below.

The part 16 of the telephone network 12 includes a transit switching center 34, e.g. of the EWSD type. The transit switching center 34 is connected via an inter-exchange line 36 to a terminal switching center 38, to which the data transmission computer DB of a subscriber TlnB is connected. A transmission route 40 goes from the transit switching center 34 to a gateway 42. The transmission route 40 is for example a PCM channel as is usually used to transmit voice data between switching centers. The function of the gateway 42 is described in more detail below.

The telephone network 12 also includes two switching centers 48 and 50, which are developments of the EWSD-type switching centers. In addition to the functions of an EWSD-type switching center, the switching centers 48 and 50 also carry out the functions of service provision computers 52 and 54. These additional functions are also described in more detail below using FIG. 1. A signaling connection 56 can be set up between the switching center 58 and the transit switching center 24 and this is used to transmit signaling messages according to the IUSP (ISDN User Part) protocol. Examples of messages of this protocol are described below using FIG. 1.

A signaling connection 58 can be set up between the switching centers 48 and 50. Signaling messages via this signaling connection are also transmitted according to the ISUP protocol. Information elements are transmitted as a component of the signaling messages in an APP (Application Association Parameter) container according to standard Q.765 Add. 1 (06/00). These information elements are described below using FIGS. 2 and 3.

A signaling connection 60 can be set up between the switching center 50 and the transit switching center 34 and this is used to transmit signaling messages according to the ISUP protocol.

Both the telephone network 12 and the internet 10 are used to transmit voice data between the subscriber TlnA and the subscriber TlnB or computer data between the computers DA and DB. Voice data or computer data is transmitted circuit-switched in voice channels within the telephone network 12. However voice data or computer data is transmitted in data packets within the internet 10.

In the gateways 28 and 42 voice data or computer data received in each of the voice channels is divided into data packets and forwarded into the internet 10. Data packets with voice data or computer data coming from the internet 10 are unpacked in the gateways 28 and 42 and forwarded in voice channels into the telephone network 12. The gateway 28 or 42 is connected via a transmission route 64 or 66 to the internet 10. This means that data packets can be exchanged via the internet 10 between the gateways 28 and 42. The service provision computers 52 and 54 are also connected to the internet 10. Data packets can therefore also be exchanged between the service provision computers 52 or 54 and the gateways 28 and 42, see signaling path 72 between the service provision computer 52 and the gateway 28 or signaling path 74 between the service provision computer 54 and the gateway 42. The gateways 28 and 42 and the service provision computers 52 and 54 each have at least one internet address, at which they are accessible in the internet 10.

Signaling messages for setting up a connection for transmitting computer data or voice data between the subscriber TlnA and the subscriber TlnB are described below. When a call connection is being set up between the subscriber TlnA and the subscriber TlnB or a data transmission connection is being set up between the computers DA and DB, the transit switching center 24 generates a connection set-up message 100, also referred to as an IAM message (Initial Address Message) at time t1 according to the ISUP protocol. This message includes, among other things for example, the full call number of the subscriber TlnB in the telephone network 12 and the number of a time slot on the transmission route 26 to be used for the transmission. The type of connection and therefore also the type of application is indicated in a parameter of the connection set-up message 100 referred to as a TMR. A value for "voice connection" is indicated for voice data. A value for "64 kBit/s unrestricted" is indicated for data transmission between computers, see standard Q.764, clause 2.1.1.1a.

The connection set-up message 100 is transmitted via the signaling connection 56. When the connection set-up message 100 has been received, a program is executed in the switching center 48, during the execution of which it is ascertained that the internet 10 can be used for the transmission of the computer data or voice data. It is determined that the gateway 28 has to be used as the interface between the telephone network 12 and the internet 10 on the side of the subscriber TlnA. The service provision computer 52 is prompted by a control unit in the switching center 48 to execute the necessary stages for this. The value of the parameter TMR is forwarded according to protocol to the service provision computer 52.

At a time t2 after the time t1 the service provision computer 52 sends a connection set-up message 102 according to defacto standard RFC 2705 to the gateway 28 via the signaling path 72. The connection set-up message 102 is also referred to as a CRCX message (Create Connection). The time slot to be used for the useful data transmission is indicated in the connection set-up message 102. Also the method according to ITU-T standard G.723.1 for the transmission of voice data is indicated based on the value in the parameter TMR as a CODEC (coding/decoding) for the transmission of voice data, so that the voice data is compressed in the gateway 28. Where necessary voice pause suppression and echo suppression can be enabled for the transmission of voice data.

However the CODEC according to ITU-T standard G.711 is used for the transmission of computer data, i.e. compression is not used. Voice pause suppression and echo suppression are disabled for the transmission of computer data.

A value for a waiting time T is also indicated in a data field "X-MaJiBu" of the connection set-up message 102 and this is described below using FIG. 5. 30 ms waiting time is selected for the transmission of voice data and 200 ms for the transmission of computer data. The data field "X-MaJiBu" was stipulated in what is referred to as an "experimental parameter", see RFC 2705, clause 3.2.2 "Parameter lines", example "X-FlowerOfTheDay: Daisy".

When the parameter "X-MaJiBu" is indicated, the automatic setting of the size of what is referred to as a jitter buffer is disabled, as this would influence the waiting time T. Automatic setting is only enabled if the parameter "X-MaJiBu" is not indicated in a connection set-up message.

The gateway 28 processes the connection set-up message 102, sets the necessary settings and generates a response message 104 in response at a time t3. The response message 104 on the one hand confirms receipt of the connection set-up message 102 and contains among other things an internet address and a port number, which can be used for the receipt of useful data for an RTP (Real Time Protocol, see RFC 1889 and RFC 1890) connection to be set up between the gateway 28 and the gateway 42 and which is now assigned to the time slot which is used on the transmission route 26 for the connection to be set up. The RTP connection is suitable for transmitting voice data or computer data.

The service provision computer 52 receives the response message 104 and forwards the received internet address and the port number to the control unit of the switching center 48. The control unit of the switching center 48 processes the connection set-up message 100 according to the ISUP protocol and generates a connection set-up message 106 at a time t4. The connection set-up message 106 is also referred to as an IAM message (Initial Address Message) according to the ISUP protocol. The connection set-up message 106 contains two information elements described in more detail below using FIGS. 2 and 3, in which the internet address and port number are forwarded, see points 107. These information elements are not stipulated in the ISUP standard but are transmitted via the signaling connection 58 in compliance with the ISUP standard. The connection message 106 also contains the parameter TMR, with the same value as in the connection set-up message 100.

The switching center 50 receives the connection set-up message 106 and also processes the information elements included in it. It is identified from the content of these information elements or from the code (CIC—Circuit Identification Code) for designating the call instance that a telephone connection using the internet 10 is to be set up, not a standard telephone connection. The gateway 42 is identified by the switching center 50 as the gateway to be used on the side of the subscriber TlnB. The switching center 50 also determines a time slot, to be used for the circuit-switched transmission of useful data between the switching centers 50 and 34. This time slot designates a transmission channel of the transmission route 40. The switching center 50 also analyzes the parameter TMR and reports this value to the service provision computer 54.

The service provision computer 54 is prompted by the control unit of the switching center 50 to set up an internet connection via the signaling path 74. At a time t5 the service provision computer 54 sends a connection set-up message 108 to the gateway 42. The connection set-up message 108 corresponds to the defacto standard RFC 2705 referred to above and is also referred to as a CRCX message (Create Connection). The message 108 includes the internet address and port number sent from the gateway 28 via the switching center 48, which are to be used for the RTP connection to be set up. The time slot identified by the switching center 50 is also included in the connection set-up message 108 as is the CODEC based on the value of the parameter TMR, in the case of voice connections the CODEC G.723.1 and in the case of data transmission connections the CODEC G.711. In the case of voice connections voice pause suppression and echo suppression are automatically enabled in the gateway 42 using the connection set-up message 108. Data fields for signaling these settings are stipulated according to defacto standard RFC 2705 for the message CRCX. In the case of data transmission connections voice pause suppression and echo suppression are however disabled.

The connection set-up message 108 also includes a value for a waiting time T in a data field "X-MaJiBu". The data field "X-MaJiBu" is, as stated above, a proprietary extension of the defacto standard RFC 2705. A value for 30 ms waiting time is indicated for the transmission of voice data. A value of 200 ms is selected for the transmission of computer data.

During the processing of the connection set-up message 108 in the gateway 42, an internet address and an as yet unused port number of the gateway 42 are identified in the indicated time slot and these can be used for receipt of the useful data packets from the gateway 28. Echo suppression and voice pause suppression are enabled or disabled. The value for the waiting time T is recorded.

Automatic setting of what is known as the jitter buffer, which would influence the waiting time T, is disabled. The gateway 42 then sends a response message 110 at a time t6 to confirm receipt of the connection set-up message 108. The response message 110 also includes the identified internet address of the gateway 42 and the identified port number.

The remainder of the connection set-up message 106 is processed in the switching center 50 according to the ISUP protocol. In this process a connection set-up message 112 is generated, which is transmitted via the signaling connection 60 to the transit switching center 34. The connection set-up message 112 is also referred to as an IAM message (Initial Address Message). The connection set-up message 112 includes among other things the call number of the subscriber TlnB and the time slot predetermined by the switching center 50. The connection set-up message 112 is processed according to protocol in the transit switching center 34 and forwarded to the terminal switching center 38. The terminal switching center 38 calls the subscriber TlnB or the computer DB.

During processing of the connection set-up message 106 after receipt of the response message 110 a transport message 114 is generated in the switching center 50 and this is also referred to according to the ISUP protocol as an APM message (Application Transport Message). The transport message 114 includes one information element with the internet address of the gateway 42 and one information element with the port number communicated by the gateway 42, see points 115. These information elements have the same structure as the information elements described below using FIGS. 2 and 3. The transport message 114 is transmitted to the switching center 48 at a time t8.

The control unit of the switching center 48 extracts the internet address and port number from the transport message 114 and prompts the service provision computer 52 to forward these connection parameters to the gateway 28. The service provision computer 52 also sends a change message 116 according to defacto standard RFC 2705 at a time t9. The change message 116 is also referred to as an MDCX message (Modify Connection). The change message 116 contains the internet address of the gateway 42 and the port number of the gateway 42 to be used for the RTP connection to be set up.

The change message 116 is processed in the gateway 28 so that a direct transmission path 118 can be used for transmitting useful data according to protocol RTP and CODEC G.711 or G.723.1 between the gateways 28 and 42. A response message generated by the gateway 28 in response to the change message 116 is not shown in FIG. 1.

At a subsequent time t10 the transit switching center 34 generates a message 120 according to protocol, the message also being referred to as an ACM message (Address Complete Message), and signals that the dial numbers have been transmitted to connect subscribers TlnA and TlnB or computers DA and DB. The message 120 is processed according to protocol by the control unit of the switching center 50. At a time t11 the switching center 50 sends an ACM message 122 to the switching center 48 according to the ISUP protocol. The switching center 48 processes the ACM message 122 and in turn sends an ACM message 124 to the transit switching center 24.

Let it be assumed that the parameter TMR has the value "64 kBit/s unrestricted". If the computer DB of the subscriber TlnB logs on, this is signaled according to the ISUP protocol to the transit switching center 34. The transit switching center 34 generates a response message 126 at a time t13 and this is transmitted via the signaling connection 60 to the switching center 50. The response message 126 is also referred to as an ANM message (Answer Message). Charging starts on the basis of this message.

The response message 126 is processed according to protocol in the switching center 50. During this process a response message 128 is sent to the switching center 48. The switching center 48 generates a response message 130 to the transit switching center 24 based on the response message 128 at a time t15.

The data coming from the computer DA of the subscriber TlnA is transmitted in the parts 14 and 16 of the telephone network 12 and via the transmission routes 26 and 40 in time slots and according to CODEC G.711. Echo suppression, voice pause suppression and compression are not executed. The data is transmitted in data packets in the internet 10. Processes in the gateway 42 are described below using FIG. 5.

Figure 2:
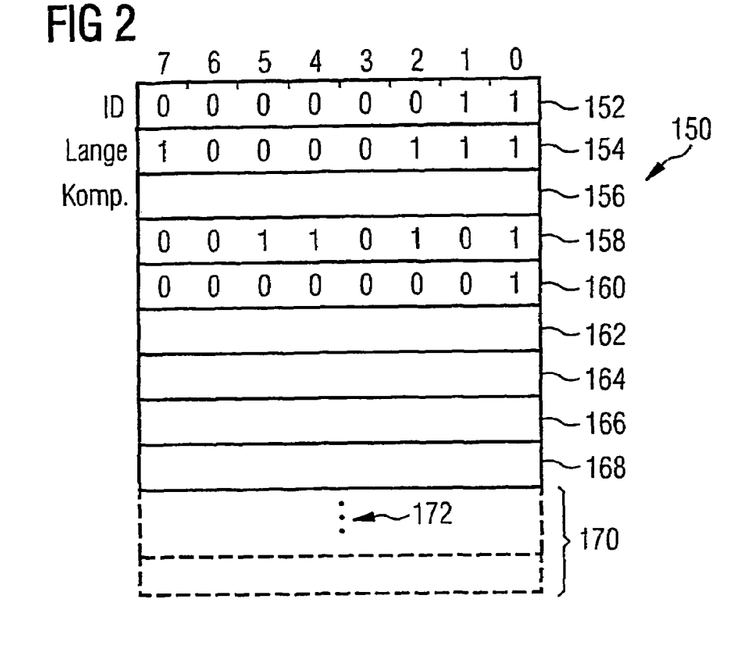
FIG. 2 shows the structure of an information element for transmitting an internet address.

FIG. 2 shows the structure of an information element 150 for transmitting an internet address. In a first embodiment the information element 150 contains nine successive data fields 152 to 168, each of which has a length of 8 bits, i.e. one byte. Bit positions 0 to 7 are in this sequence from right to left. An identifier is transmitted in the data field 152 to identify the information element 150. The identifier has the value 3, which is used in the standard Q.765.5 to refer to what is known as an "Interworking Function Address" and which here shows that the information element 150 is used to transmit an internet address.

In a data field 154 the length of the information element 150 is specified minus the data fields 152 and 154. In the embodiment the value seven in stored in binary mode in the data field 154, see also standard Q.765.5, clause 11.1.1.

Compatibility information is transmitted in the data field 156, the value of which shows the recipient what should be done if it is not possible to process the information element 150 fully, see also standard Q.765.5, clause 11.1.1.

In the data field 158 an authorization and format identifier is transmitted, which has the value "35" in hexadecimal notation. This value is used according to ITU standard X.213 Annex A as reference to the internet protocol.

In the data field 160 an identifier with the value one is stored, when an internet address is transmitted according to internet protocol version 4. The four bytes of the internet address are then transmitted in the adjacent data fields 162 to 168 according to version 4 of the internet protocol.

If, on the other hand, an internet address is to be transmitted according to internet protocol version 6 using the information element 150, there is a difference in the length details, see data field 154 and a difference in the data field 160. In the data field 160 the value zero is transmitted during transmission of internet addresses according to internet protocol version 6. In this case, sixteen data fields 162 to 170 are adjacent to the data field 160, with the 16 bytes of the internet address stored in these according to internet protocol version 6, see also points 172.

Figure 3:
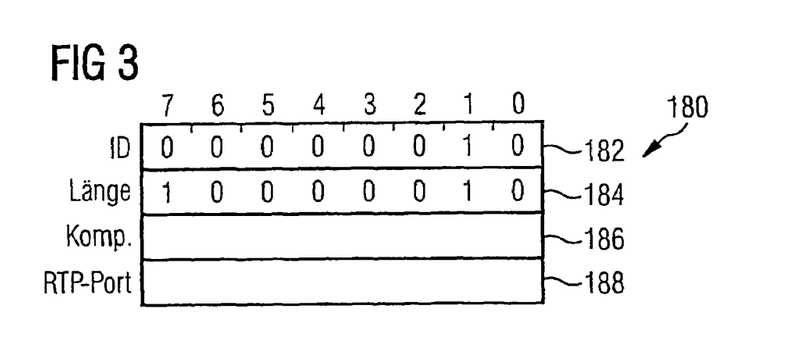
FIG. 3 shows the structure of an information element for transmitting an RTP port number.

FIG. 3 shows the structure of an information element 180 for transmitting a port number. The information element 180 includes four data fields 182 to 188, each with a length of one byte. The significance of the data fields 182 to 186 corresponds in this sequence to the significance of the data fields 152 to 156 of the information element 150. The value two is transmitted in the data field 182 to identify the information element 180 as the information element for transmitting a port number. The identifier transmitted in the data field 182 is referred to as a "backbone network connection identifier" contrary to the function provided here in the standard Q.765.5. The value two is transmitted in a data field 184 as the length of the information element 180 minus the data fields 182 and 184. Information on compatibility is transmitted in the data field 186. The port number to be transmitted is then transmitted in the data field 188, for example the port number to be used for the RTP connection in the gateway 28 or in the gateway 42, see FIG. 1.

Figure 4:
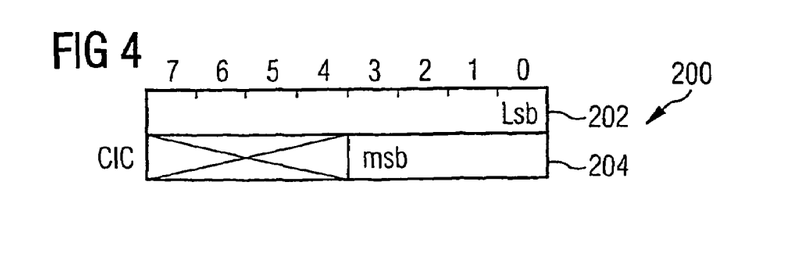
FIG. 4 shows the structure of a code element for designating the call instance.

FIG. 4 shows the structure of a code element 200, which is used to designate call instances between the switching centers 48 and 50. The structure of the code element 200 is stipulated in the standard Q.763, clause 1.2. The code element 200 includes two data fields 202 and 204, each of which has a length of one byte. The number of the instance is transmitted starting with the lowest value bit in the data field 202, see bit position 0, to bit position 7 of the data field 202 and then onwards between bit positions 0 to 3 of the data field 204. Bit positions 4 to 7 of the data field 204 are not used to designate the instance. The code element 200 has no further data fields.

Figure 5:
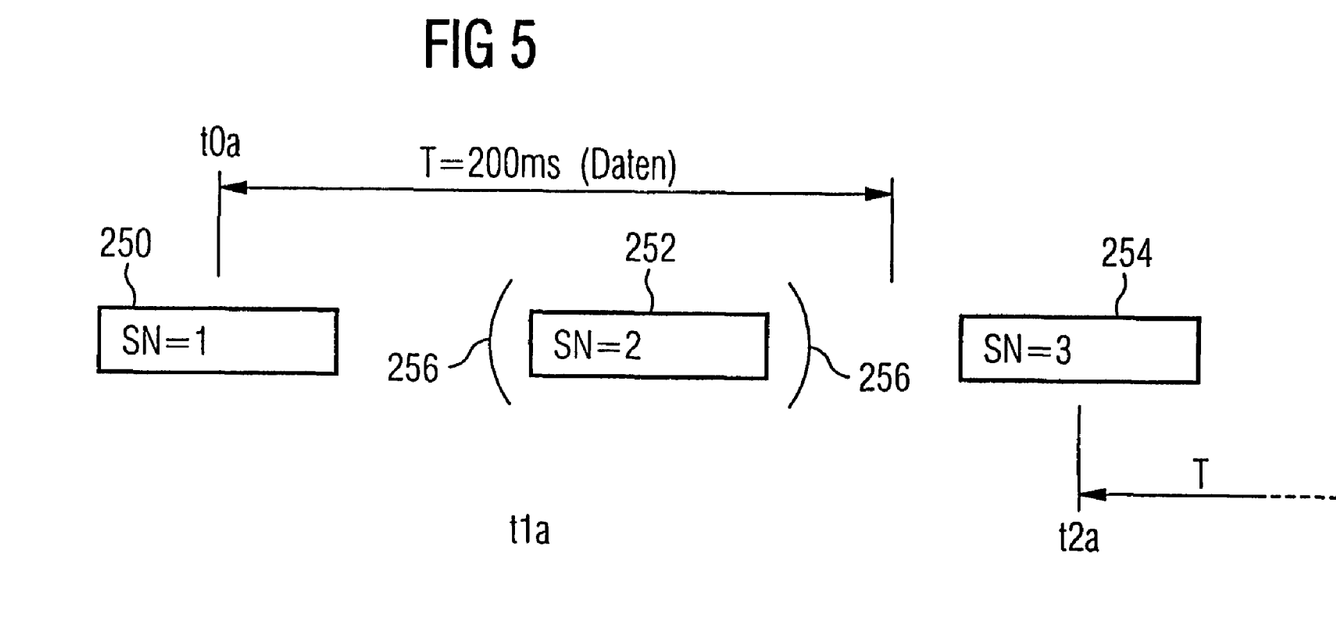
FIG. 5 shows successive data packets and waiting times.

FIG. 5 shows three data packets 250, 252 and 254, which are sent in this sequence from the gateway 28 to the internet 10, to transmit computer data to the computer DB of the subscriber TlnB. The data packet 250 contains a sequence number SN with the value one. A sequence number SN with the value 2 or 3 is indicated in the data packet 252 or the data packet 254. The sequence number is stipulated in the defacto standard RFC 1889.

The value in the data field "X-MaJiBu" in the connection set-up message 108 means that a waiting time T of 200 milliseconds has been selected in the parameter TMR based on the value "64 kBit/s unrestricted" characterizing a data transmission.

The data packet 250 is received in the gateway 42 at a time t0a. Starting from this time t0a the system waits 200 milliseconds for the arrival of the data packet 252. Let it be assumed that the data packet 252 does not arrive within this time period, see brackets 256. After expiry of the waiting time T of 200 milliseconds the gateway 42 requests the repeat transmission of the data packet 252. If the data packet 252a then arrives at a time t1a, the gateway 42 resets the sequence according to the sequence number SN. The forwarding of the useful data then continues in the time channel of the transmission route 40. At a time t2a the data packet 254 arrives in the gateway 42. The waiting time T until the arrival of the fourth data packet is again 200 milliseconds.

If voice data is transmitted from the subscriber TlnA to the subscriber TlnB, the value "voice data" in the parameter TMR means that 30 milliseconds is selected as the waiting time T. If the currently awaited data packet of the sequence does not arrive after this time, filler data is forwarded for example via the transmission route. The next data packet is then processed according to the sequence.

Similar processes to those described using FIG. 5 take place in the gateway 28 for the counter direction. A waiting time T of 200 milliseconds is also deployed during the transfer of the computer data received via the internet 10 to the time channel of the transmission route 26.

In another, embodiment signaling messages according to the BICC standard are used to signal between the switching centers 48 and 50. Otherwise the processes described using FIGS. 1 to 5 remain unchanged.

In a further embodiment the value of the parameter "X-MaJiBu" directly determines the size of a buffer for storing the data packets in the gateways. This indirectly determines the waiting time, as processing has to continue when the buffer overflows.

The components specified in the embodiments are for example components of the SIEMENS AG SURPASS system, see the website www.siemens.com/data&voice. The service provision computers are therefore components of the hiQ component of the SURPASS system.

What is claimed is:

1. A method for transmitting data of different applications via a packet transmission network, in which data packets include routing data and useful data in a packet transmission network, comprising:

predetermining different values of a comparison variable for different applications depending on the application for which the useful data is transmitted, the comparison variable determining waiting times in which communication equipment in the packet transmission network waits for a sequence of data packets to arrive;

forwarding a sequence of data packets based on the routing data in the packet transmission network, and transmitting the data packets according to a predetermined transmission protocol;

restoring the sequence of the data packets on receipt of the data packets; and processing the received data packets according to the sequence, wherein the processing of the data packets is continued in the restored sequence based on the comparison variable, even if one of the data packets in the sequence has not yet been received, or where a repeated transmission of at least one data packet is requested based on the comparison variable.

2. The method according to claim 1, wherein the data packets each include a sequence number to determine the sequence and/or time details, indicating a relationship between the useful data included in the relevant data packet and a reference time or a reference clock.

3. The method according to claim 1, wherein the transmission protocol is a protocol which is suitable for the real-time transmission of useful data.

4. The method according to claim 1, wherein one type of application is a real-time transmission of voice data and another type of application is a transmission of computer data, which is stored in full in a transmission unit before the start of transmission and/or the value of the comparison variable for the transmission of computer data is substantially higher than the value of the comparison variable for the transmission of voice data.

5. The method according to claim 1, further comprising transmitting useful data across a transmission path that is established between two terminals of a circuit-switched telecommunication network, selecting a section of the transmission path between two gateways in the packet transmission network, controlling the gateways by at least one control unit, and receiving the data packets via the control unit of the gateways, wherein the control units are used to predetermine the value of the comparison variable.

6. The method according to claim 5, further comprising a control unit located at a distance from a gateway, and transmitting control message between the control unit and gateway using a standard protocol or a defacto standard protocol.

7. The method according to claim 6, wherein the control unit sends a connection set-up message to the gateway receiving the data packets, and the comparison variable is indicated in the connection set-up message, and the comparison variable is stipulated in a packet.

8. The method according to claim 1, wherein when determining the transmission path, at least one switching center is used to switch data in a circuit-switched data transmission network, and the type of data application is identified using a parameter stipulated in a signaling protocol for switching centers, and the switching center determines the value for the comparison variable.

9. The method according to claim 1, wherein the packet transmission network is the internet or another data transmission network operating according to the internet protocol.

10. The method according to claim 1, wherein the value of the comparison variable directly indicates a waiting time or the value of the comparison variable determines the size of a buffer for storing data packets.

11. A method for transmitting data of different applications via a packet transmission network, in which data packets include routing data and useful data in a packet transmission network, comprising:

predetermining different values of a comparison variable for different applications depending on the application for which the useful data is transmitted, the comparison variable determining waiting times in which communication equipment in the packet transmission network waits for a sequence of packets to arrive;

forwarding a sequence of data packets based on the routing data in the packet transmission network, and transmitting the data packets according to a predetermined transmission protocol;

restoring the sequence of the data packets on receipt of the data packets;

processing the received data packets according to the sequence, wherein the processing of the data packets is continued in the restored sequence based on the comparison variable, even if one of the data packets in the sequence has not yet been received, or where a repeated transmission of at least one data packet is requested based on the comparison variable; and determining the transmission path, wherein at least one switching center is used to switch data in a circuit-switched data transmission network, and the type of data application is identified using a parameter stipulated in a signaling protocol for switching centers, and the switching center determines the value for the comparison variable.

* * * * *